United States Patent [19]

Lee

[11] 4,325,663

[45] Apr. 20, 1982

[54] ARRANGEMENT FOR CLEANING CUTTING FLUID

[75] Inventor: Hyosong M. Lee, Tumba, Sweden

[73] Assignee: Alfa-Laval AB, Tumba, Sweden

[21] Appl. No.: 116,675

[22] PCT Filed: Oct. 9, 1978

[86] PCT No.: PCT/SE78/00056

§ 371 Date: Jun. 11, 1979

§ 102(e) Date: Jun. 8, 1979

[87] PCT Pub. No.: WO79/00192

PCT Pub. Date: Apr. 19, 1979

[51] Int. Cl.³ ............ B23Q 11/10

[52] U.S. Cl. ............ 409/136; 210/168; 408/56

[58] Field of Search ............ 408/56; 409/136, 135; 210/268, 171, 703; 29/94, 77, 78, 50

[56] References Cited

U.S. PATENT DOCUMENTS

| | | | |
|---|---|---|---|
| 2,578,040 | 12/1951 | Boothekl | 210/168 X |
| 2,895,883 | 7/1959 | Hobson | 210/168 X |
| 3,817,384 | 6/1974 | Tanaica et al. | 210/168 X |
| 3,897,335 | 7/1975 | Brandt | 210/171 X |
| 3,954,611 | 5/1976 | Reedy | 210/168 X |
| 4,094,783 | 6/1978 | Jackson | 210/703 |
| 4,139,464 | 2/1979 | Conard | 210/168 |

FOREIGN PATENT DOCUMENTS

| | | | |
|---|---|---|---|
| 1365332 | 8/1974 | United Kingdom | 210/168 X |

*Primary Examiner*—William R. Briggs
*Attorney, Agent, or Firm*—Cyrus S. Hapgood

[57] ABSTRACT

The invention relates to a method and an arrangement for cleaning cutting fluid used for metal machining. The cutting fluid is withdrawn from the collecting tank (1) at a metal cutting machine by means of vacuum and conveyed to a central cleaning plant by way of a container (3) connected to a vacuum pump. From the cleaning plant the cutting fluid is returned to the collecting tank (1) at the metal cutting machine. The cleaning plant may with advantage comprise a separation tank (6), where separation takes place by gravity and a centrifugal separator (8).

7 Claims, 2 Drawing Figures

ARRANGEMENT FOR CLEANING CUTTING FLUID

TECHNICAL FIELD

The present invention relates to a method of cleaning cutting fluid used for the metal machining, at which the cleaning of the cutting fluid takes place in a central cleaning plant and an arrangement for carrying through the method. The cleaning plant cleans the cutting fluid from a number of collecting tanks.

In connection with metal machining cutting fluids have been used since long for lubricating and cooling. The cutting fluid shall cool the tool used for the cutting, the workpiece and the formed chips and reduce the friction by forming a lubricating film between the sliding surfaces. Usually the cutting fluid contains among all corrosion protecting agents, emulsifiers and bactericides. Every metal cutting machine has in a collecting tank a supply of cutting fluid and from the tank the cutting fluid is pumped to a nozzle and sprayed over the workpiece and the tool. When the cutting fluid passes the cutting spot it brings along larger and smaller metal chips. The larger metal chips are separated by passing the fluid through some kind of straining means, for example a plate or a case provided with small openings, on its way to the collecting tank. The cutting fluid is in addition to the metal chips often contaminated by oil, which spreads as a surface layer over the cutting fluid. In spite of the bactericides a growth of bacteria may take place under the film of oil, which results in very ill-smelling breaking down products. The staff handling the metal cutting machines run the risk of infections on arms and hands as a consequence of the fact that the cutting fluid is contaminated with bacteria, solid particles and oil.

BACKGROUND ART

Earlier contaminated cutting fluid has been cleaned centrally by conveying the cutting fluid through pipelines in and below the floor to a cleaning plant in connection with a central tank. Contaminants of metal have been separated by passing the cutting fluid through different types of filter. Oil has been removed from the surface of the tank by means of a bandskimmer. It is very difficult to remove all of the oil without bringing along a large part of cutting fluid, which makes the method uneconomical.

According to the invention a method and an arrangement for cleaning of cutting fluid is now proposed which may easily be installed in existing engineering plants without any expensive changes or rebuildings and which implies that important advantages are achieved for the staff at the metal cutting machines, which no longer have to be exposed to ill-smelling gases and skin irritation by metal chips and oil in the cutting fluid.

DISCLOSURE OF INVENTION

The method according to the invention is characterized mainly in that contaminated cutting fluid by means of vacuum is conveyed from the collecting tank at the cutting place to a container, which is connected to a vacuum pump. From the container the contaminated oil is conveyed to a cleaning plant and is thereafter returned to the collecting tank. By sucking the cutting fluid in this way from the collecting tank to the cleaning plant it is possible to avoid bulky transporting arrangements in and below the floor or an expensive manual handling and also to avoid the use of pumps which may be damaged by the small metal particles which follow the cutting fluid. A cleaning system according to the invention is also very flexible. It may easily be adapted to the location of the cutting machines in the plant and further cutting machines may easily be connected to the cleaning plant. The cleaning of the cutting fluid may take place continuously when the metal cutting machine is working. It is also possible to suck the cutting fluid to the cleaning plant at shorter or longer intervals.

According to the method of the invention the main part of the cutting fluid is brought to circulate in order to cool and lubricate the tool and the workpiece, while a lesser part of the content in the collecting tank is sucked away and conveyed to the cleaning plant. This indicates that if some error should occur in the cleaning plant there is anyhow enough fluid to make metal cutting possible.

In order to convey the cutting fluid back to the cutting place the cleaned cutting fluid is put under pressure, when the cutting fluid has passed the cleaning plant.

The contaminated cutting fluid is according to the invention with advantage cleaned by passage through a separation tank. In this separation tank a separation by means of gravity takes place since light contaminants, as oil, collected in the upper part of the separation tank whereas metal chips and heavy contaminants sink to the bottom of the separation tank. From the separation tank a first fraction containing cutting fluid and light contaminants is withdrawn and this fraction is led to a separator, for example a centrifugal separator. The cleaned cutting fluid withdrawn from the separator is together with a second fraction from the separation tank mainly containing cutting fluid conveyed to a second tank in which the collected cutting fluid is put under pressure and returned to the collecting tank at the cutting place. Owing to this combination of cleaning steps an efficient cleaning of the contaminated fluid is obtained with relatively simple means as well as an essential reduction of the amount of bacteria, solid particles and oil in the cutting field.

According to the invention an arrangement for carrying through the described method of cleaning cutting fluid is also suggested. This arrangement mainly comprises a pipeline arranged to be placed under vacuum, which pipeline at one end opens under the surface in a collecting tank for cutting fluid and in its other end is connected to a container, which in its turn is connected to the vacuum pump. The arrangement also comprises a cleaning plant for contaminated cutting fluid which has been sucked away from the collecting tank and a second pipeline by the aid of which cutting fluid is returned to the collecting tank.

The proposed arrangement is further preferably provided with a second tank for cleaned cutting fluid, which is connected between the cleaning plant and the second pipeline, which second tank is provided with means in order to put the cutting fluid under pressure.

The cleaning plant according to the invention suitably comprises a separation tank with a tangential inlet for contaminated cutting fluid and a first outlet for a first fraction comprising cutting fluid and light contaminants and a second outlet for a second fraction consisting mainly of cutting fluid. The first fraction is led to a separator, for example a centrifugal separator, and from this a heavy phase containing cleaned cutting fluid and a light phase containing light contaminants are withdrawn. The outlet for heavy phase from the separator and the second outlet of the separation tank are connected to the second tank mentioned above.

The separation tank is with advantage designed such that in its centre there is arranged an insertion with walls which inside the insertion define two fluid chambers delimited from the fluid chamber in the separation tank. The first of these fluid chambers has an inlet which consists of a brim inlet from the fluid chamber in the separation tank and an outlet which extends through the fluid chamber in the separation tank. The second fluid chamber has an inlet which is connected to the fluid chamber in the separation tank in such a manner that the same liquid level is obtained both in the separation tank and in the second fluid chamber and an outlet which extends out of the separation tank. A level-holding means is arranged to sense the liquid level of the second fluid chamber and supply clean fluid when the level sinks.

BRIEF DESCRIPTION OF DRAWINGS

The proposed method of cleaning cutting fluid and an arrangement for carrying through this method are described closer with reference to the enclosed drawing, FIG. 1 of which shows a flow chart of a preferred embodiment of the invention and FIG. 2 of which schematically shows an embodiment of a separation tank used for the described embodiment. In the flow chart obvious details like valves have been omitted.

BEST MODE OF CARRYING OUT THE INVENTION

Figure 1:
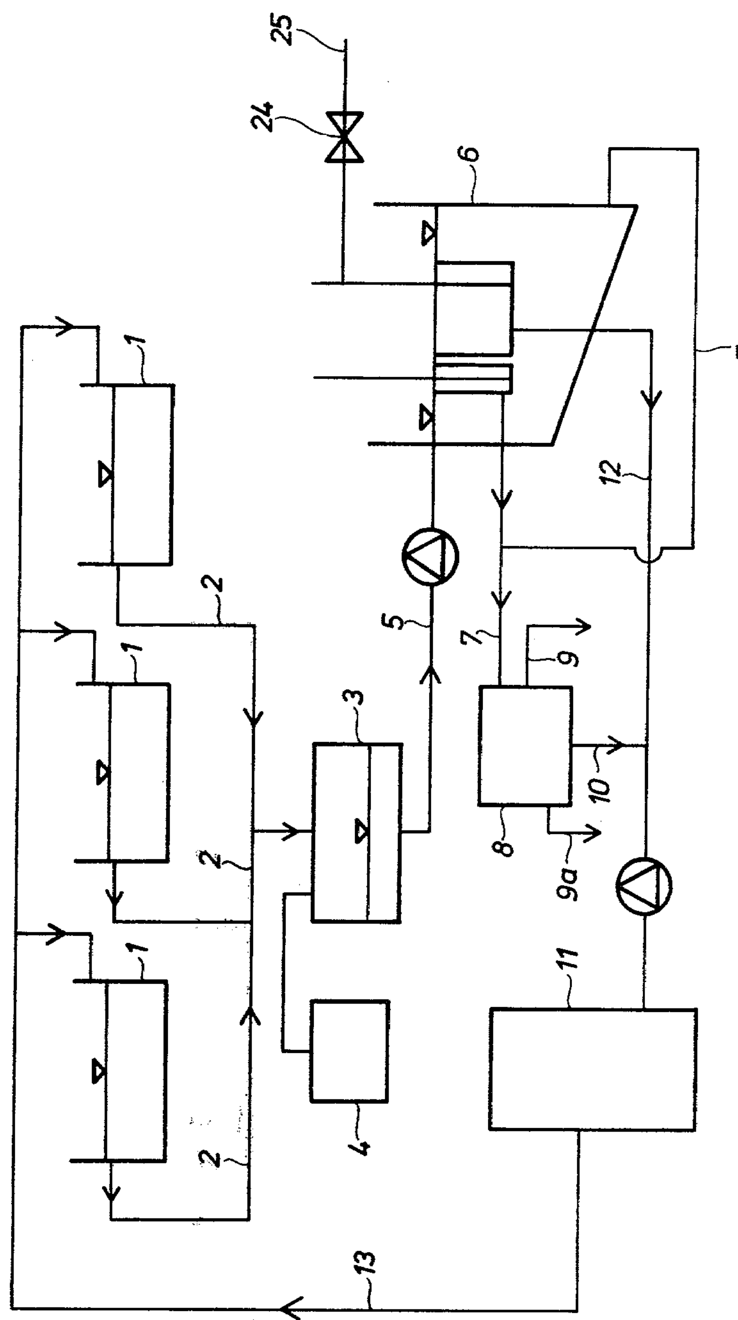

In FIG. 1 a number of collecting tanks for cutting fluid at cutting machines are shown. From the collecting tanks 1 contaminated cutting fluid is conveyed to a container 3, by way of a pipeline 2. The pipeline 2 may with advantage be arranged at some height over the metal cutting machines, in the same way as in a pipeline milking plant. The container 3 is connected to a vacuum pump 4 and by means of this the container 3 and the pipeline 2 are put under vacuum. At each connection the pipeline 2 ends just below the surface in the collecting tank. The cutting fluid contaminated with oil is sucked on to the cleaning plant, while the heavier metal particles remain on the bottom of the collecting tank. From the container 3 the contaminated cutting fluid is conveyed to the separation tank 6 by way of a pipeline 5. The inlet for cutting fluid is arranged such that the cutting fluid is given a tangential movement in the separation tank. Light contaminants are at this gathered near the surface in the middle of the separation tank and from there a fraction is withdrawn which is directed to a separator 8 by way of a pipeline 7. The mixture of cutting fluid, sludge and metal particles, which are separated in the separation tank 6, is conveyed to pipeline 7 by way of pipeline **7*a***.

In the shown embodiment of the invention the separator consists of a centrifugal separator but it is also possible to separate light contaminants from the cutting fluid by means of a skimmer, while heavy contaminants are separated by means of filter.

Through the light phase outlet 9 of the centrifugal separator oil and other light contaminants are withdrawn and through the sludge outlet **9*a* solid contaminats. The obtained heavy phase which contains cleaned cutting fluid is conveyed to a second tank 11 for cleaned cutting fluid by way of a pipeline 10. A second fraction from the separation tank which mainly contains cleaned cutting fluid is also transported to the tank 11 by way of a pipeline 12. The cutting fluid is put under pressure by means which not are shown and returned by way of the pipeline 13 to the collecting tanks 1 at the cutting machine. Also pipeline 13 may be arranged over the machines. The collecting tanks are with advantage provided with liquid level indicators (not shown in the drawing) in order to hinder that the tanks overflow. There is also a throttling at the inlet of pipeline 2** in order to control the amount of air sucked into the vacuum system (not shown in the drawing).

Figure 2:
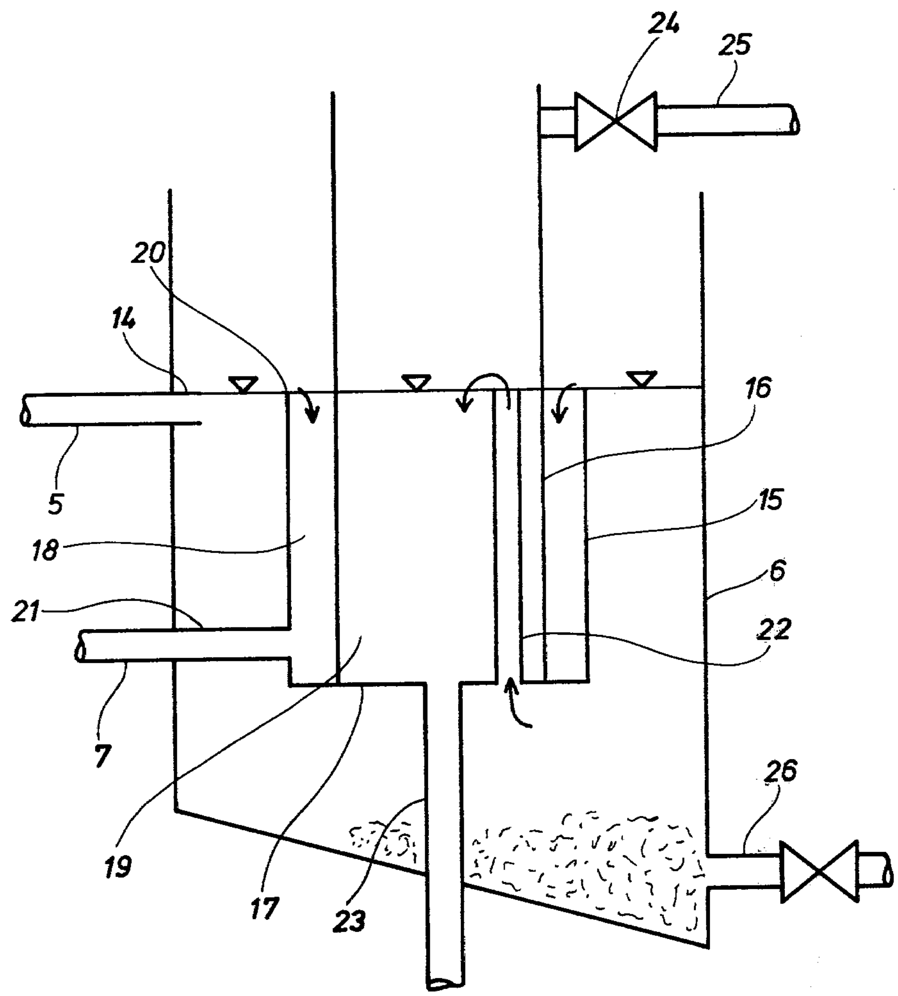

In FIG. 2 there is shown the separation tank 6 with a tangential inlet 14 connected with the pipeline 5. In the separation tank 6 there is also arranged an insertion with two coaxial, cylindrical walls 15, 16 and a bottom 17. In the insertion these walls separate two fluid chambers 18, 19 delimited from the fluid chamber in the separation tank. In this embodiment the insertion consists of two coaxial cylinders but it may of course be designed in some other way as long as the in- and outlets of the insertion are designed such that the same flow conditions that are described below are obtained. The upper edge 20 of the cylindrical wall 15 is arranged such that the edge is situated just below the liquid level in the separation tank. The inlet to the fluid chamber 18 consequently consists of an annular brim inlet over the edge 20. The fluid chamber 18 also has an outlet 21, which extends through the separation chamber and is connected to the pipeline 7. Inside the wall 16 there is a second fluid chamber 19. In this second fluid chamber 19 there is arranged a pipe 22, the lower part of which is fastened to the bottom of the insertion and the upper end of which is situated at the same level as the edge 20. Through this pipe the fluid chamber 19 is connected to the fluid chamber in the separation tank. In the bottom 17 of the insertion there is also arranged an outlet 23 from the fluid chamber 19 which is connected to the pipeline 12. A level sensing means (not shown in the drawing), for example a float, is also arranged in the fluid chamber 19, which means actuate a valve 24 in a feed pipe 25 for clean cutting fluid. In the bottom of the separation tank there is also an outlet pipeline 26 for sludge separated in the separation tank, which pipeline is connected to the pipeline **7*a***.

The separation tank according to the invention is intended to work in the following way. When the contaminated cutting fluid is conveyed tangentially into the separation tank light contaminants are gathered in the middle of the tank and flow over the brim inlet into the fluid chamber 18. Heavy contaminants on the other hand sink towards the bottom of the tank and are collected there. Owing to the fact that the inlet to the fluid chamber 19 is arranged on a certain depth in the separation tank the cutting fluid that is collected in the fluid chamber 19 will be relatively clean.

According to the invention the cleaning of the cutting fluid takes place in no less than four steps. The first step consists of the preliminary separation of heavier metal contaminants in the collecting tank, while an upper fraction of the collecting tank is sucked to the cleaning plant. Step two consists of the passage of the container 3 in which a certain part of the heavy particles are gathered at the bottom of the container, which particles intermittently are withdrawn from the bottom. Step three consists of the cleaning in the separation tank which is described above. Step four consists of the cleaning in the centrifugal separator from which, apart from the two liquid phases, a sludge phase consisting of small metal particles is withdrawn continuously or intermittently, which metal particles have not been separated in earlier separation steps.

According to the invention a reduction of the amount of bacteria is obtained. This effect has also been shown experimentally, since measurements have shown that the amount of bacteria, when cleaning according to the invention, has diminished from $10^9$ bacteria/ml to $10^6$ bacteria/ml, which is considered as a satisfactory value. That the amount of bacteria has diminished is supposed to depend on the fact that around the metal particles there is a thin film of oil, in which a growth of bacteria takes place. When the small metal particles are separated a certain amount of bacteria accordingly follow them.

I claim:

1. The combination of a series of collecting tanks for respective metal cutting machines, a cutting liquid in each said tank for use in metal machining, a first pipeline having inlet branches opening into said tanks in position to remove therefrom only an upper layer of cutting liquid, a container into which the outlet end of said pipeline leads, a vacuum pump connected to said container for creating a vacuum therein to draw cutting liquid from said tanks into said container, means connected to said container for receiving cutting liquid therefrom and cleaning said liquid, and a second pipeline for returning cutting liquid from said cleaning means to said collecting tanks.

2. The combination of claim 1, comprising also a additional tank interposed between said cleaning means and said additional pipeline, and means associated with said second tank for maintaining the liquid therein under pressure.

3. The combination of claim 1, in which said cleaning means comprises a separation tank having a tangential inlet for receiving contaminated cutting liquid from said container, the separation tank also having a first outlet for a first separated fraction comprising cutting liquid and light contaminants and a second outlet for a second fraction consisting mainly of cutting liquid, a separator connected to said first outlet for receiving said first fraction from the separation tank, said separator having an outlet for a heavy phase consisting of cleaned cutting liquid, said separator also having outlet means for separately discharging a light phase consisting of light contaminants, and ducts through which said second outlet of said separation tank and said heavy phase outlet of said separator lead to said second pipeline.

4. The combination of claim 3, in which said separator is a centrifugal separator.

5. The combination of claim 3, in which said separation tank includes a main liquid chamber and first and second sub-chambers separated from said main chamber and substantially surrounded thereby, said first sub-chamber having a brim forming a liquid inlet from said main chamber and also having an outlet extending through the separation tank, said second sub-chamber having an inlet connected to said main chamber and operable to provide the same liquid level in both said main chamber and said second sub-chamber, the second sub-chamber also having an outlet extending through the separation tank, and level-maintaining means for sensing the liquid level in said second sub-chamber and supplying fresh cutting liquid thereto when said sensed liquid level sinks.

6. The combination of claim 1, in which said cleaning means comprises a separation tank and a separator, said separation tank having a tangential inlet for receiving contaminated cutting liquid from said container, the separation tank including a main liquid chamber into which said tangential inlet opens, the separation tank also including first and second sub-chambers separated from said main chamber and substantially surrounded thereby, said first sub-chamber having a brim forming a liquid inlet from said main chamber and also having an outlet extending through the separation tank and leading to said separator, said second sub-chamber having an inlet connected to said main chamber and operable to provide the same liquid level in both said main chamber and said second sub-chamber, the second sub-chamber also having an outlet extending through the separation tank and leading to said second pipeline independently of said separator, said separation having outlet means for separately discharging a light phase containing light contaminants, said separator also having an outlet for a heavy phase constituting cleaned cutting liquid, said heavy phase outlet leading to said second pipeline.

7. The combination of claim 6, in which said main chamber of the separation tank has a sludge outlet leading to said separator.

* * * * *

UNITED STATES PATENT AND TRADEMARK OFFICE

CERTIFICATE OF CORRECTION

PATENT NO. : 4,325,663

DATED : April 20, 1982

INVENTOR(S) : Hyosong M. Lee

It is certified that error appears in the above-identified patent and that said Letters Patent are hereby corrected as shown below:

Col. 2, line 43, change "field" to --fluid--.

Col. 5, line 35 (line 3 of claim 2), change "additional" to --second--.

Col. 5, line 36 (line 4 of claim 2), change "second" to --additional--.

Col. 6, line 39 (line 18 of claim 6), change "separation" to --separator--.

Signed and Sealed this

*Fifth* Day of *October 1982*

[SEAL]

*Attest:*

GERALD J. MOSSINGHOFF

*Attesting Officer* *Commissioner of Patents and Trademarks*